United States Patent
Cameron et al.

(10) Patent No.: US 10,642,291 B2
(45) Date of Patent: May 5, 2020

(54) VALVE AND VALVE SYSTEM RESPONSIVE TO FLUID TEMPERATURE

(71) Applicant: HS MARSTON AEROSPACE LTD, Wolverhampton (GB)

(72) Inventors: Sean L. Cameron, West Midlands (GB); David Russell Scott, Walsall (GB); Stuart Anthony Astley, West Midlands (GB); Nigel Philip Clark, West Midlands (GB); Patrick James Jones, Staffs (GB)

(73) Assignee: HS MARSTON AEROSPACE LTD, Wolverhampton (GB)

( * ) Notice: Subject to any disclaimer, the term of this patent is extended or adjusted under 35 U.S.C. 154(b) by 1113 days.

(21) Appl. No.: 13/973,493

(22) Filed: Aug. 22, 2013

(65) Prior Publication Data

US 2014/0054387 A1 Feb. 27, 2014

(30) Foreign Application Priority Data

Aug. 24, 2012 (GB) ..................... 1215163

(51) Int. Cl.
*G05D 23/185* (2006.01)
*G05D 7/03* (2006.01)
*G05D 23/02* (2006.01)

(52) U.S. Cl.
CPC ........... *G05D 23/1852* (2013.01); *G05D 7/03* (2013.01); *G05D 23/02* (2013.01)

(58) Field of Classification Search
CPC ......... F28F 27/00; F28F 27/02; F16K 31/002; Y10T 137/7737; Y10T 137/0324; G05D 23/1333

(Continued)

(56) References Cited

U.S. PATENT DOCUMENTS 4,699,171 A * 10/1987 Sugden ............... F16K 17/0473
137/468
4,782,853 A * 11/1988 Moen .................... F16K 11/078
137/454.6

(Continued)

FOREIGN PATENT DOCUMENTS

DE 29705018 U1 5/1997
DE 29804427 U1 7/1998

(Continued)

OTHER PUBLICATIONS

Alex Ruderman, Voltage Modulation Strategies and Performance Limitations of Multilevel PWM Rectifiers, ELMO Motion Control Ltd, IEEEI, 2008, pp. 016-020.

(Continued)

*Primary Examiner* — Jianying C Atkisson
*Assistant Examiner* — Meraj A Shaikh
(74) *Attorney, Agent, or Firm* — Cantor Colburn LLP

(57) ABSTRACT

A valve is provided and includes a bypass block defining a bypass flowpath fluidly communicable with main flowpaths, a member disposable within the bypass block to occupy and move between first and second positions, the member being configured to permit fluid flow through the bypass flowpath when occupying the first position and to block a portion of the bypass flowpath to thereby prevent fluid flow through the bypass flowpath when occupying the second position and an elastic element. The elastic element is coupled to the member and configured to bias the member in a biasing direction toward the second position responsive to a temperature of fluid flowing along the main flowpaths.

20 Claims, 6 Drawing Sheets

(58) Field of Classification Search
USPC .................. 236/101 R, 93 R, 103, 101 D
See application file for complete search history.

(56) References Cited

U.S. PATENT DOCUMENTS

| | | | | |
|---|---|---|---|---|
| 5,141,153 | A * | 8/1992 | Jeffress | F16K 31/002 137/614.18 |
| 5,803,354 | A * | 9/1998 | Benedict | G05D 23/134 236/101 D |
| 6,253,837 | B1 * | 7/2001 | Seiler | F16H 57/0413 137/625.29 |
| 6,471,134 | B2 * | 10/2002 | Chamot | F01P 7/167 236/34.5 |
| 7,540,431 | B2 * | 6/2009 | Kozdras | G05D 23/1333 137/535 |
| 8,353,462 | B2 * | 1/2013 | Todaka | F16K 11/07 236/101 A |
| 2004/0226613 | A1 * | 11/2004 | Ono | F01M 1/16 137/468 |
| 2009/0007972 | A1 * | 1/2009 | Lum | F16K 31/002 137/468 |
| 2010/0213401 | A1 * | 8/2010 | Martin | F01M 5/007 251/321 |
| 2012/0090815 | A1 * | 4/2012 | Cameron | F16K 31/002 165/67 |
| 2014/0263680 | A1 * | 9/2014 | Jackson, Jr. | F16K 17/386 236/101 R |

FOREIGN PATENT DOCUMENTS

| | | | | |
|---|---|---|---|---|
| EP | 0443416 | A1 * | 8/1991 | ........... F16K 31/002 |
| EP | 1544009 | A2 * | 6/2005 | ......... B60H 1/00485 |
| EP | 2444703 | A1 | 4/2012 | |

OTHER PUBLICATIONS

EP search dated Oct. 11, 2012, EP application: GB1215163.5, 8 pages.

* cited by examiner

VALVE AND VALVE SYSTEM RESPONSIVE TO FLUID TEMPERATURE

CROSS REFERENCE TO RELATED APPLICATION

This application claims the benefit of priority of United Kingdom Patent Application No. 1215163.5, filed Aug. 24, 2012.

BACKGROUND OF THE INVENTION

The subject matter disclosed herein relates to a valve and a valve system and, more particularly, to a valve and a valve system that are responsive to a fluid temperature.

In various applications, such as the automotive and aircraft industries, thermal valves are commonly installed in inlet or outlet ports of heat exchangers where header tanks or bypass flowpaths connect the inlet and outlet ports of a fluid stream. The valves balance flows between the inlet and the outlet ports of the heat exchanger to maintain required fluid temperatures and pressures. To this end, the valves generally incorporate a heat and/or pressure relief mechanism whereby, if the system heat or pressure reaches a critical point, the valve allows fluid to bypass the heat exchanger core to prevent, for example, over pressurisation in the heat exchanger core and potential damage.

Currently, the temperature balancing mechanism of typical thermal valves relies on wax extension technology using either a flat elastomer diaphragm or an elastomer bag. In the case of the elastomer bag, as the wax heats, it expands and exerts a force on the elastomer bag and a piston assembly coupled to the bag to close the valve. By contrast, as the wax cools, it contracts and causes the piston assembly to return to its initial position. In practice, it has been observed that the wax in wax extension technology can have a lower reliability than required and lose the ability to function up to the desired number of thermal cycles. Also, wax tends to have a slow thermal response characteristic, which makes the timing of the thermal valves difficult to manage. Further, wax extension technology requires structural elements for containing the wax so that wax and oil contamination can be avoided.

BRIEF DESCRIPTION OF THE INVENTION

According to one aspect of the invention, a valve is provided and includes a bypass block defining a bypass flowpath fluidly communicable with main flowpaths, a member disposable within the bypass block to occupy and move between first and second positions, the member being configured to permit fluid flow through the bypass flowpath when occupying the first position and to block a portion of the bypass flowpath to thereby prevent fluid flow through the bypass flowpath when occupying the second position and an elastic element. The elastic element is coupled to the member and configured to bias the member in a biasing direction toward the second position responsive to a temperature of fluid flowing along the main flowpaths.

According to another aspect of the invention, a valve is provided and is disposed in a housing defining main flowpaths. The valve includes a structure defining first and second flowpaths fluidly communicable with corresponding ones of the main flowpaths, respectively, and a third flowpath fluidly interposed between the first and second flowpaths, a member disposable within the structure to occupy and move between first and second positions, the member being configured to permit fluid flow through the third flowpath when occupying the first position and to prevent fluid flow through the third flowpath when occupying the second position and an elastic element. The elastic element includes memory metal alloy (MMA) coupled to the member and configured to bias the member in a biasing direction oriented transversely relative to the third flowpath such that the member moves toward the second position. The elastic element is responsive to a temperature of fluid flowing along the main flowpaths.

According to yet another aspect of the invention, a valve system is provided and includes a heat exchanger, a housing configured to deliver and remove fluid to and from the heat exchanger along main flowpaths and a valve disposed within the housing. The valve includes a bypass block defining a bypass flowpath fluidly communicable with the main flowpaths, a member disposable within the bypass block to occupy and move between first and second positions, the member being configured to permit fluid flow through the bypass flowpath when occupying the first position and to block a portion of the bypass flowpath to thereby prevent fluid flow through the bypass flowpath when occupying the second position and an elastic element coupled to the member and configured to bias the member in a biasing direction toward the second position responsive to a temperature of fluid flowing along the main flowpaths. The portion of the bypass flowpath is transversely oriented relative to the biasing direction.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects, a valve may be used to provide thermal relief and/or pressure relief to a system. The valve may include one or more springs to facilitate such relief.

Figure 1:
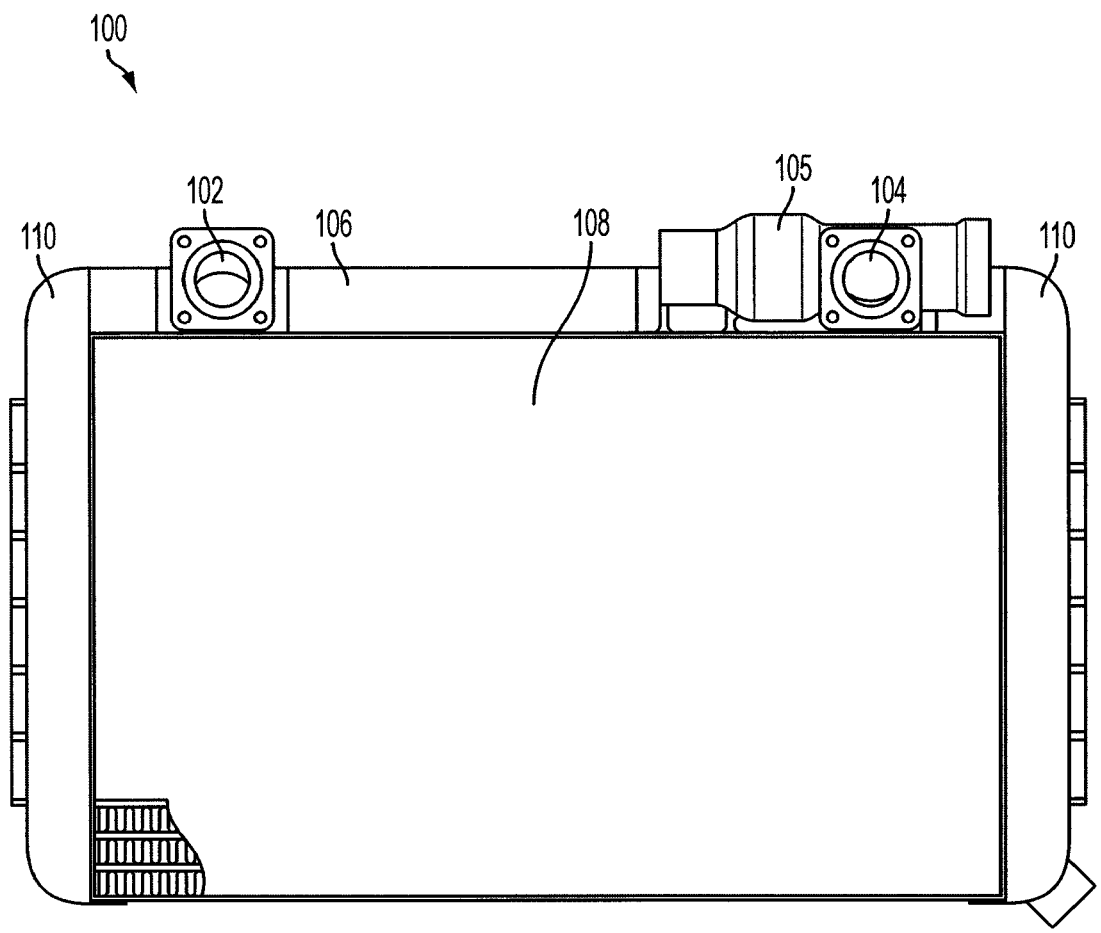
FIG. 1 illustrates an exemplary heat exchanger in accordance with embodiments.

FIG. 1 illustrates an environment in which one or more aspects may be implemented or practiced. In particular, FIG. 1 illustrates a heat exchanger 100. The heat exchanger 100 may be configured to provide or support, e.g., thermal and/or pressure relief in connection with a fluid flowing through a system. For example, the heat exchanger 100 may be used in connection with, e.g., aircraft, automotive, or (gas) turbine engine industries.

The heat exchanger 100 includes an inlet 102 and an outlet 104. The inlet 102 may be configured to receive one or more fluids, such as oil. The outlet 104 may be configured to dispense or provide one or more fluids, such as oil. The inlet 102 and the outlet 104 may be fluidly coupled to one another via an inlet/outlet header tank 106 to thereby allow for a flow of fluid from the inlet 102 to the outlet 104.

In some embodiments, the heat exchanger 100 may include a heat exchange matrix 108, to which at least one or two matrix header tanks 110 may be fluidly coupled. In some embodiments, when fluid entering the inlet 102 is too hot, the fluid may be forced into the matrix 108 where the fluid may be cooled before being permitted to flow through the outlet 104. By contrast, if the fluid is cool, a large proportion of the fluid may be permitted to flow from the inlet 102, through inlet/outlet header tank 106 and exit at the outlet 104 without entering matrix 108. In order to control the extent to which fluid is forced into matrix 108, one or more valves 105 may be installed in heat exchanger 100. While the valve 105 is shown at the outlet port 104, it shall be understood that it could be located at the inlet port 102 in another embodiment.

Embodiments of the valve 105 will now be described below with reference to FIGS. 2-6. With initial reference to FIGS. 2 and 3, it will be understood that the valve 105 may be disposed in a housing 200. The housing 200 is formed to define an inlet 201, an inlet port 202, an outlet port 203 and an outlet 204. The inlet port 202 may lead for example to a heat exchanger 210, which is coupled to the housing 200. The outlet port 203 permits fluid flow from the heat exchanger 210 back to the housing 200. Fluid, such as oil, may thus flow from the inlet 201 to the inlet port 202 along a first main flowpath 220 that is directed toward the heat exchanger 210. By contrast, the fluid may flow from the heat exchanger 210 and through the outlet port 203 and then the outlet 204 along a second main flowpath 221. The valve 105 is disposed within a chamber 230 defined by interior surfaces of the housing 200 and is secured in place by a cap 240.

Figure 2:
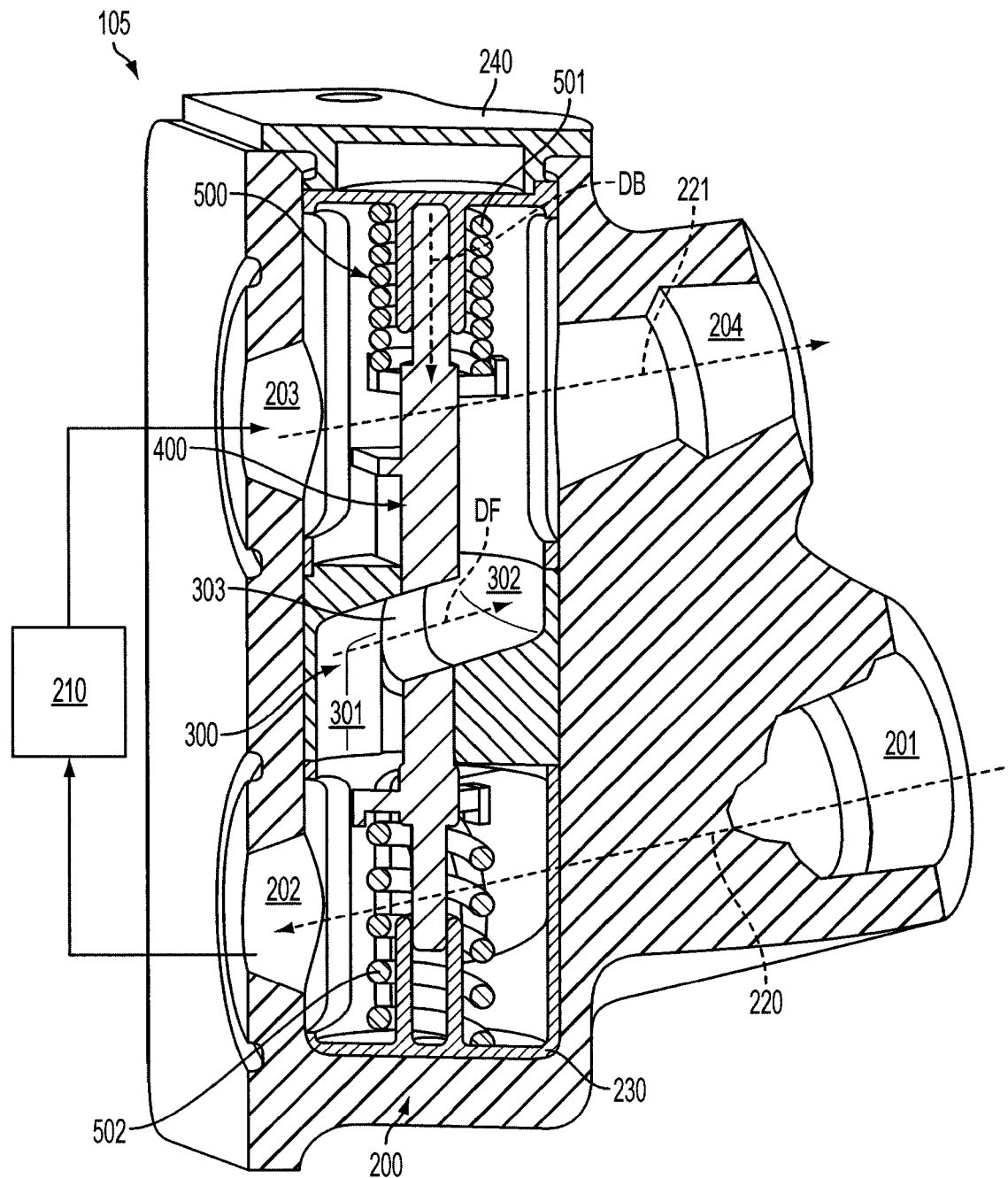
FIG. 2 is a cutaway perspective view of a valve system in a bypassed condition in accordance with embodiments.
Figure 3:
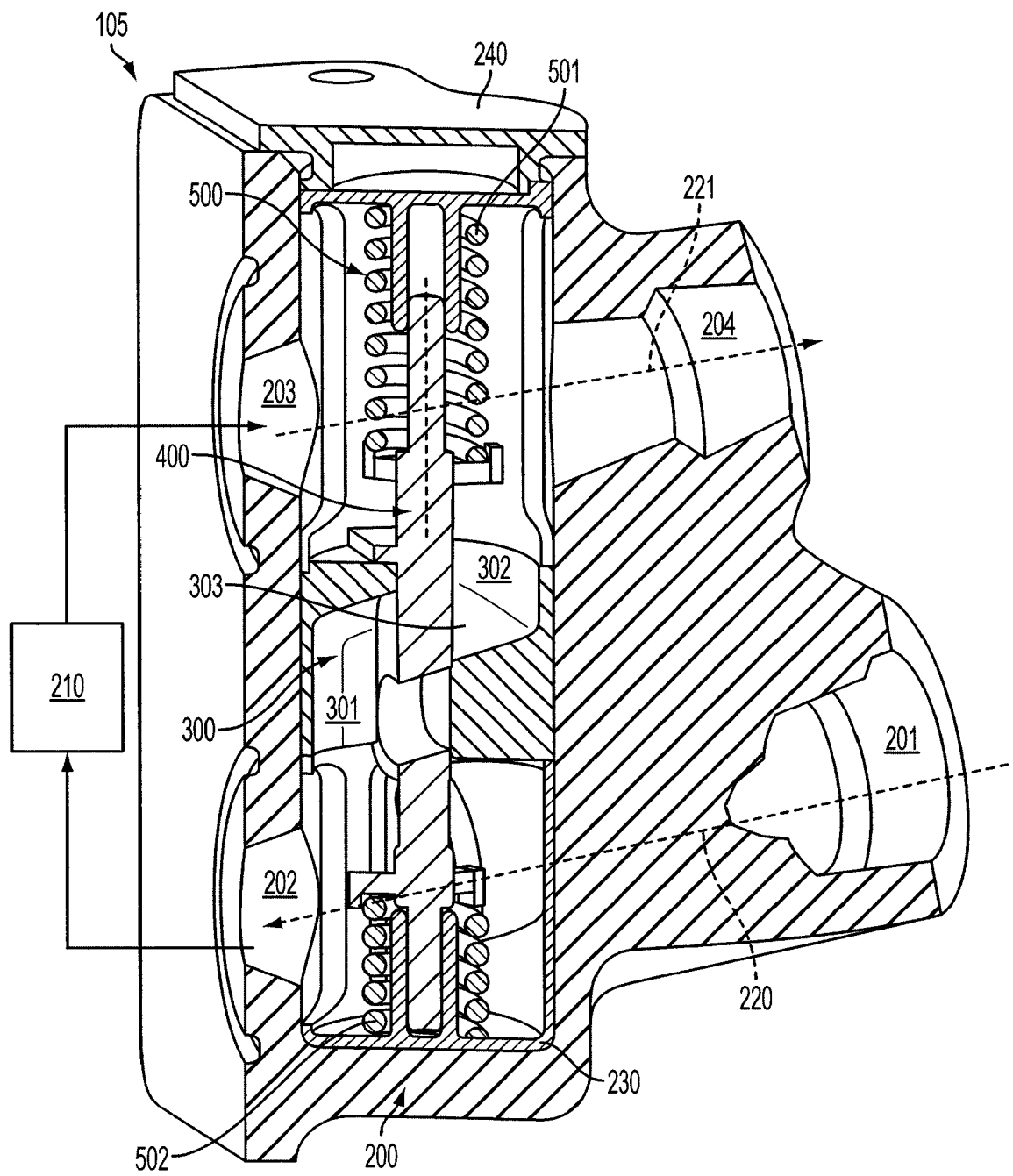
FIG. 3 is a cutaway perspective view of a valve system in a non-bypassed condition in accordance with embodiments.

As shown in FIGS. 2 and 3, the valve 105 includes a structure 300. The structure 300 is formed to define a first flowpath 301, a second flowpath 302 and a third flowpath 303. The first flowpath 301 is disposed to be fluidly communicable with the first main flowpath 220 and the second flowpath 302 is disposed to be fluidly communicable with the second main flowpath 221. The third flowpath 303 is fluidly interposed between the first flowpath 301 and the second flowpath 302. With this configuration, when the third flowpath 303 is opened (as will be described below), fluid is permitted to flow from the inlet 201 to the first flowpath 301 and from the first flowpath 301 to the outlet 204 via the third flowpath 303 and the second flowpath 302. Some fluid may also flow from the inlet 201 to the heat exchanger 210 but the pressure drop through the heat exchanger 210 drives most of the fluid through the third flowpath 303 and the second flowpath 302.

The valve 105 further includes a member 400 and an elastic element 500. The member 400 is selectively disposed within the structure 300 and is configured to occupy and move between a first position as shown in FIG. 2 and a second position as shown in FIG. 3. The member 400 is further configured to permit fluid flow through the third flowpath 303 when occupying the first position and to prevent fluid flow through the third flowpath 303 when occupying the second position. The elastic element 500, in an embodiment, is a memory metal alloy (MMA) and is coupled to the member 400. Due to the presence of the MMA, the elastic element 500 is responsive to a temperature of fluid flowing along the first and second main flowpaths 220 and 221 and is configured to bias the member 400 in accordance with the fluid temperature in a biasing direction, DB, such that the member 400 is forced to move toward the second position.

In accordance with embodiments, the biasing direction, DB, may be oriented transversely relative to a predominant direction, DF, of fluid flow through the third flowpath 303 (see FIG. 2). In this way, the elastic element 500 is not required to overcome opposing forces applied by pressures of the fluid in the first and second flowpaths 220 and 221 in order to move the member 400. As such, various materials may be selected for the elastic element 500 generally and for the MMA in particular.

The MMA of the elastic element 500 may be provided as a memory metal alloy (MMA) spring 501. In this case, when the fluid in the first and second flowpaths 220 and 221 is cool or relatively cold, the MMA spring 501 will tend to remain in a compressed state that corresponds to the condition in which the member 400 is disposed in the first position. Alternatively, when the fluid in the first and second flowpaths 220 and 221 is hot or relatively hot, the MMA spring 501 will tend to expand or extend to an extended state that corresponds to the condition in which the member 400 is disposed in the second position.

Since the MMA spring 501 will tend to remain in the extended position even if the temperature of the fluid cools down, the elastic element 500 may further include a bias spring 502. The bias spring 502 is coupled to the member 400 and configured to apply a restorative bias to the member 400 such that the member 400 may be returned to the first position when the fluid is cool or relatively cold.

In accordance with embodiments, the MMA spring 501 may be formed of one or more materials, such as nickel titanium alloys, pure or with copper, e.g., Ni—Ti or Ni—Ti—Cu. The bias spring 502 may be formed of carbon steel. The MMA spring 501 will be expected to be useful over hundreds of thousands of cycles without memory loss or performance degradation. Thus, the MMA spring 501 will provide for an ability to set transition temperatures and a width of the hysteresis curve of the valve 105 and will have a spring rate change that will be very responsive to temperature changes and accurate. For example, the materials of the MMA spring 501 and the bias spring 502 may be selected such that the spring rate of the MMA spring 501 is lower than the spring rate of the bias spring 502 in cold fluid but is higher than the spring rate of the bias spring 502 in hot fluid.

Figure 4:
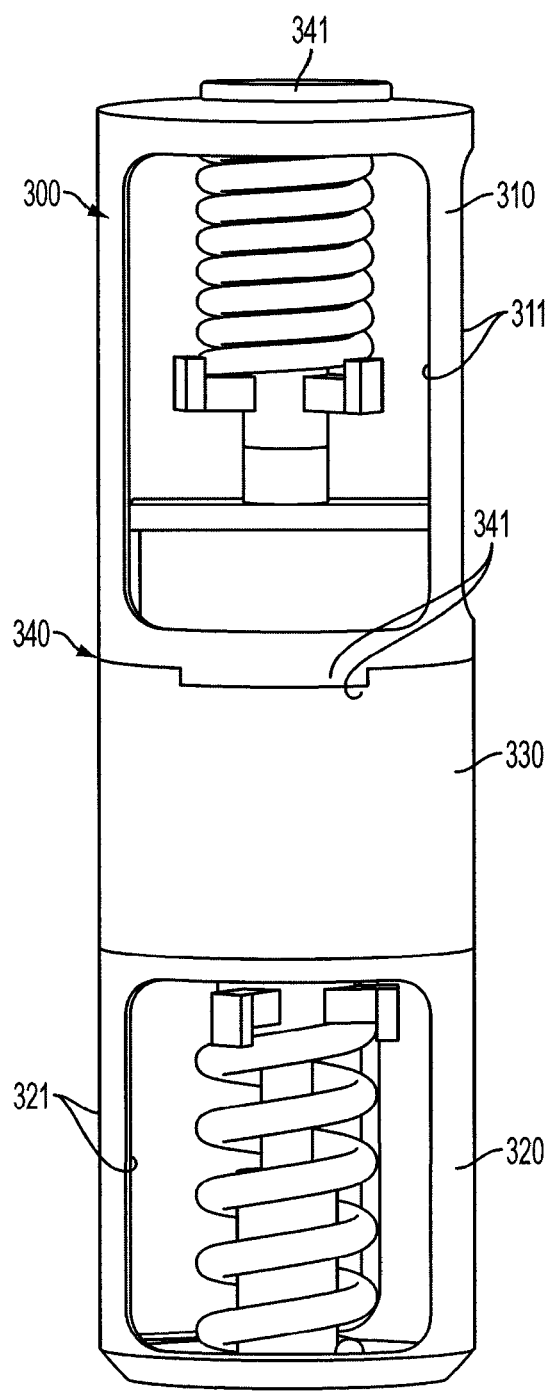
FIG. 4 is a perspective view of a valve of the valve system of FIGS. 2 and 3.

With reference to FIG. 4, the structure 300 may include multiple axial parts, such as a first frame 310, a second frame 320 and a bypass block 330, and anti-rotation features 340 to align one or more of the multiple axial parts with the housing 200 and/or another one of the multiple axial parts. As shown in FIG. 4, the first frame 310 defines a first series of apertures 311 and the second frame 320 defines a second series of apertures 321. With the structure 300 disposed within the housing 200, the first main flowpath 220 may be directed to flow through the second series of apertures 321 and the second main flowpath 221 may be directed to flow through the first series of apertures 311.

The bypass block 330 is disposed between the first frame 310 and the second frame 320 and is formed to define the first flowpath 301 with a substantially axial or longitudinal orientation, the second flowpath 302 with a substantially axial or longitudinal orientation and the third flowpath 303 with an orientation that is transverse to those of the first and second flowpaths 301 and 302. Thus, the third flowpath 303 may have axial and radial components and crosses from one side of the bypass block 330 to the other side.

The anti-rotation features 340 may be provided as keyed components 341, which are coupled to the bypass block 330 and complementary sections of the first and second frames 310 and 320. The keyed components 341 may also be provided at respective distal ends of the first and second frames 310 and 320 to provide additional resistance to rotation relative to the housing 200 and the cap 240.

Figure 5:
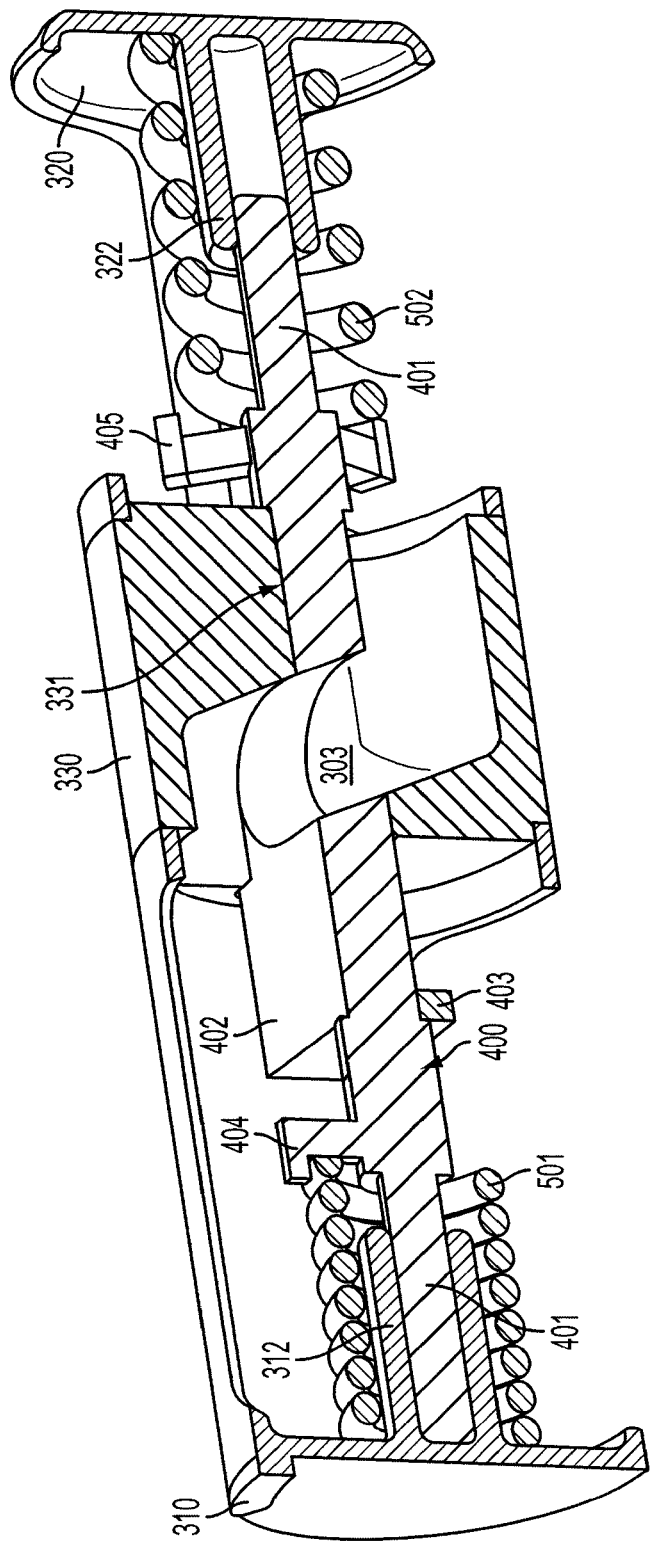
FIG. 5 is another perspective view of the valve of the valve system of FIGS. 2 and 3.
Figure 6:
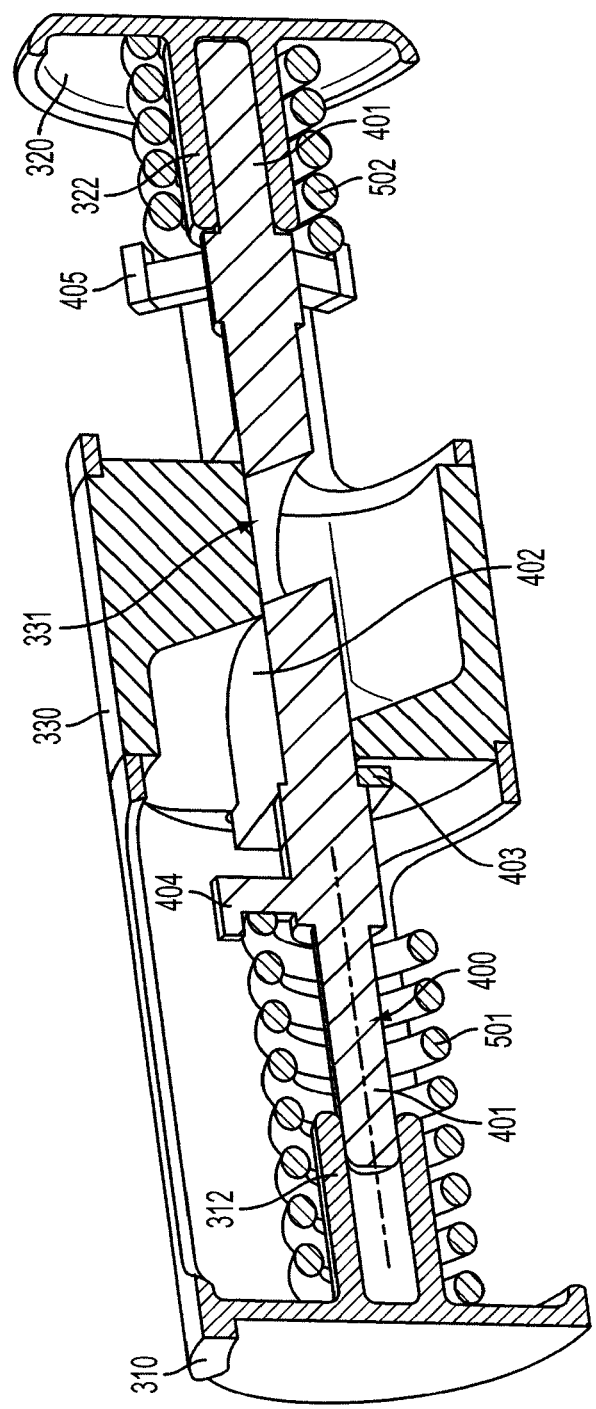
FIG. 6 is another perspective view of the valve of the valve system of FIGS. 2 and 3.

With reference to FIGS. 5 and 6, first frame 310 includes a first anchoring portion 312, the second frame 320 includes a second anchoring portion 322 and the bypass block 330 is formed to define a slot 331 extending through a central region of the structure 300. The member 400 includes a shaft portion 401, a sliding door 402 and a mechanical stop 403. The shaft portion 401 has opposite ends that are movably receivable within the first and second anchoring portions 312 and 322, respectively, and includes a first retaining element 404, which is configured to retain an end of the MMA spring 501 and a second retaining element 405, which is configured to retain an end of the bias spring 502. The sliding door 402 is provided at a central portion of the member 400 and is formed as a planar element with a recess adjacent to the planar element. The planar element is disposable to block the third flowpath 303 when the member 400 occupies the second position. The recess is similarly disposable to clear the third flowpath 303 when the member 400 occupies the first position. The mechanical stop 403 is coupled to the shaft portion 401 and configured to abut the bypass block 330 when the member 400 occupies the second position. The mechanical stop 403 thus forms a torturous path for fluid to flow around the bypass block 330 as leakage flow.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A valve, comprising:
a bypass block defining a bypass flowpath fluidly communicable with main flowpaths, the bypass flowpath comprising a first bypass flowpath extending longitudinally at a first side of the bypass block from one of the main flowpaths, a second bypass flowpath extending longitudinally at a second side of the bypass block toward another of the main flowpaths, a third bypass flowpath extending longitudinally from the first to the second side of the bypass block to be fluidly interposed between the first and second bypass flowpaths and first and second obtuse bends defined at intersections of the first and third and the third and second bypass flowpaths, respectively;
a member configured to be disposed within the bypass block to occupy and move between first and second positions, the member comprising an elongate block having a first surface facing the first side and a second surface facing a second side and defining an aperture extending from the first surface to the second surface, the member being disposed and configured such that the aperture aligns with the third bypass flowpath to permit fluid flow through the bypass flowpath when the member occupies the first position and such that the aperture becomes misaligned with the third bypass flowpath to block a portion of the third bypass flowpath to thereby prevent fluid flow through the bypass flowpath when the member occupies the second position; and
an elastic element coupled to the member and configured to bias the member in a biasing direction toward the second position responsive to a temperature of fluid flowing along the main flowpaths,
wherein the member is elongate in the biasing direction and the biasing direction is parallel with predominant directions of fluid flows through both respective longitudinal extents of the first and second bypass flowpaths.

2. The valve according to claim 1, wherein a predominant direction of fluid flow through the portion of the third bypass flowpath is transversely oriented relative to the biasing direction.

3. The valve according to claim 1, wherein the main flowpaths are directed into and out of a heat exchanger.

4. The valve according to claim 3, wherein the fluid flowing along the main flowpaths comprises oil.

5. The valve according to claim 1, wherein the elastic element comprises a memory metal alloy (MMA) spring.

6. The valve according to claim 5, wherein the elastic element further comprises a bias spring configured to apply a restorative bias to the member.

7. A valve disposed in a housing defining main flowpaths, the valve comprising:
a structure defining a first flowpath extending longitudinally at a first side of the structure from and fluidly communicating with one of the main flowpaths, a second flowpath extending longitudinally at a second side of the structure toward and fluidly communicating with another one of the main flowpaths, a third bypass flowpath extending longitudinally from the first to the second side of the structure to be fluidly interposed between the first and second flowpaths and first and second obtuse bends defined at intersections of the first and third and the third and second flowpaths, respectively;
a member disposable within the structure to occupy and move between first and second positions, the member comprising an elongate block having a first surface facing the first side and a second surface facing a second side and defining an aperture extending from the first surface to the second surface, the member being disposed and configured such that the aperture aligns with the third bypass flowpath to permit fluid flow through the third bypass flowpath when the member occupies the first position and such that the aperture becomes misaligned with the third bypass flowpath to prevent fluid flow through the third bypass flowpath when the member occupies the second position; and
an elastic element including memory metal alloy (MMA) coupled to the member and configured to bias the member in a biasing direction oriented transversely relative to the third bypass flowpath such that the member moves toward the second position, the elastic element being responsive to a temperature of fluid flowing along the main flowpaths,
wherein the member is elongate in the biasing direction and the biasing direction is parallel with predominant directions of fluid flows through both respective longitudinal extents of the first and second flowpaths.

8. The valve according to claim 7, wherein the main flowpaths are directed into and out of a heat exchanger.

9. The valve according to claim 8, wherein the fluid flowing along the main flowpaths comprises oil.

10. The valve according to claim 7, wherein the elastic element comprises a memory metal alloy (MMA) spring.

11. The valve according to claim 10, wherein the elastic element further comprises a bias spring configured to apply a restorative bias to the member.

12. The valve according to claim 7, wherein the structure comprises:
multiple axial parts; and
anti-rotation features to align one or more of the axial parts with the housing and/or another one of the axial parts.

13. The valve according to claim 12, wherein the multiple axial parts of the structure comprise:
first and second frames defining apertures through which the main flowpaths extend; and
a bypass block disposed between the first and second frames, the bypass block being formed to define the first, second and third flowpaths.

14. The valve according to claim 13, wherein the anti-rotation features comprise keyed components coupled to the bypass block and complementary sections of the first and second frames.

15. The valve according to claim 13, wherein the member comprises:
a shaft portion including a retaining element configured to retain the elastic element;
a sliding door, which is disposable to block the third bypass flowpath when the member occupies the second position and to clear the third bypass flowpath when the member occupies the first position; and
a mechanical stop configured to abut the bypass block when the member occupies the second position.

16. A valve system, comprising:
a heat exchanger;
a housing configured to deliver and remove fluid to and from the heat exchanger along main flowpaths; and
a valve disposed within the housing, the valve comprising:
a bypass block defining a bypass flowpath fluidly communicable with the main flowpaths, the bypass flowpath comprising a first bypass flowpath extending longitudinally at a first side of the bypass block from one of the main flowpaths, a second bypass flowpath extending longitudinally at a second side of the bypass block toward another of the main flowpaths, a third bypass flowpath extending longitudinally from the first to the second side of the bypass block to be fluidly interposed between the first and second bypass flowpaths and first and second obtuse bends defined at intersections of the first and third and the third and second bypass flowpaths, respectively;
a member disposable within the bypass block to occupy and move between first and second positions, the member comprising an elongate block having a first surface facing the first side and a second surface facing a second side and defining an aperture extending from the first surface to the second surface, the member being disposed and configured such that the aperture aligns with the third bypass flowpath to permit fluid flow through the bypass flowpath when the member occupies the first position and such that the aperture becomes misaligned with the third bypass flowpath to block a portion of the third bypass flowpath to thereby prevent fluid flow through the bypass flowpath when the member occupies the second position; and
an elastic element coupled to the member and configured to bias the member in a biasing direction toward the second position responsive to a temperature of fluid flowing along the main flowpaths,
the member being elongate in the biasing direction, the biasing direction being parallel with predominant directions of fluid flows through both respective longitudinal extents of the first and second bypass flowpaths and a predominant directions of fluid flows through the portion of the third bypass flowpath being transversely oriented relative to the biasing direction.

17. The valve system according to claim 16, wherein the fluid flowing along the main flowpaths comprises oil.

18. The valve system according to claim 16, wherein the elastic element comprises memory metal alloy (MMA).

19. The valve system according to claim 16, wherein the elastic element comprises a memory metal alloy (MMA) spring.

20. The valve system according to claim 19, wherein the elastic element further comprises a bias spring configured to apply a restorative bias to the member.

* * * * *